US012755522B2

(12) United States Patent
Moon et al.

(10) Patent No.: US 12,755,522 B2
(45) Date of Patent: Oct. 6, 2026

(54) SYSTEM AND METHOD FOR CLASSIFYING NOVEL CLASS OBJECTS

(71) Applicant: ELECTRONICS AND TELECOMMUNICATIONS RESEARCH INSTITUTE, Daejeon (KR)

(72) Inventors: Ye-Bin Moon, Pohang-si (KR); Yongjin Kwon, Daejeon (KR); Jin Young Moon, Daejeon (KR); Tae-Hyun Oh, Pohang-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 308 days.

(21) Appl. No.: 18/435,265

(22) Filed: Feb. 7, 2024

(65) Prior Publication Data

US 2024/0273889 A1 Aug. 15, 2024

(30) Foreign Application Priority Data

Feb. 9, 2023 (KR) ........................ 10-2023-0017184
Jun. 7, 2023 (KR) ........................ 10-2023-0072979

(51) Int. Cl.
*G06V 10/82* (2022.01)
*G06V 10/764* (2022.01)
*G06V 10/77* (2022.01)

(52) U.S. Cl.
CPC .......... *G06V 10/82* (2022.01); *G06V 10/7715* (2022.01)

(58) Field of Classification Search
USPC .......................................................... 382/100
See application file for complete search history.

(56) References Cited

U.S. PATENT DOCUMENTS

| | | | | |
|---|---|---|---|---|
| 7,734,064 | B2 | 6/2010 | Chang et al. | |
| 11,087,184 | B2 | 8/2021 | Min et al. | |
| 11,481,649 | B2 | 10/2022 | Shi et al. | |
| 11,501,438 | B2 * | 11/2022 | Xu | G06T 12/30 |
| 11,521,396 | B1 * | 12/2022 | Jain | G06F 18/2415 |
| 2021/0012226 | A1 * | 1/2021 | Shi | G06F 18/2413 |
| 2021/0124993 | A1 * | 4/2021 | Singh | G06F 18/214 |
| 2021/0256322 | A1 | 8/2021 | Lee et al. | |

(Continued)

FOREIGN PATENT DOCUMENTS

WO WO-2021191908 A1 * 9/2021 ............. G06N 3/088

OTHER PUBLICATIONS

Kim, Geonuk, Hong-Gyu Jung, and Seong-Whan Lee. "Few-shot object detection via knowledge transfer." 2020 IEEE international conference on systems, man, and cybernetics (SMC). IEEE, 2020. (Year: 2020).*

(Continued)

*Primary Examiner* — Chineyere Wills-Burns
*Assistant Examiner* — Bezawit Nolawi Shimeles
(74) *Attorney, Agent, or Firm* — LRK PATENT LAW FIRM

(57) ABSTRACT

Disclosed herein are a system and method for classifying novel class objects. The method of classifying novel class objects includes (a) constructing a novel classifier considering prior knowledge acquired from a base classifier, and (b) learning a parameterized weight coefficient of a novel classifier model during the training of the novel classifier.

16 Claims, 7 Drawing Sheets

(56) References Cited

U.S. PATENT DOCUMENTS

| | | | | |
|---|---|---|---|---|
| 2021/0295155 | A1* | 9/2021 | Vijayakumar | G06N 3/09 |
| 2021/0406582 | A1* | 12/2021 | Wang | G06F 18/214 |
| 2022/0343638 | A1* | 10/2022 | Wang | G06N 3/045 |
| 2022/0392058 | A1* | 12/2022 | Legarreta Gorrono | G06T 7/0012 |
| 2022/0414869 | A1* | 12/2022 | Butler | G06T 7/11 |
| 2023/0153943 | A1* | 5/2023 | Kuen | G06V 10/751 382/100 |

OTHER PUBLICATIONS

Spyros Gidaris et al., "Dynamic Few-Shot Visual Learning without Forgetting", Proceedings of the IEEE Conference on Computer Vision and Pattern Recognition (CVPR), 2018.

Parsa Nooralinejad et al. "PRANC: Pseudo Random Networks for Compacting deep models" Advances in Neural Information Processing Systems (NeurIPS)., 2022, arXiv:2206.08464v1 [cs.LG] Jun. 16, 2022.

Tsung-Yi Lin et al., "Feature Pyramid Networks for Object Detection", arXiv:1612.03144v2 [cs.CV] Apr. 19, 2017.

* cited by examiner

FIG. 6

| | BASE | NOISE | DETECTION | | SEGMENTATION | |
|---|---|---|---|---|---|---|
| | | | AP | AP50 | AP | AP50 |
| (A) | | | 9.28 | 16.79 | 7.94 | 14.72 |
| (B) | ✓ | | 9.69 | 17.30 | 8.26 | 15.25 |
| (C) | ✓ | ✓ | 9.81 | 17.60 | 8.33 | 15.46 |

SYSTEM AND METHOD FOR CLASSIFYING NOVEL CLASS OBJECTS

CROSS-REFERENCE TO RELATED APPLICATIONS

This application claims priority to and the benefit of Korean Patent Application Nos. 10-2023-0017184, Feb. 9, 2023, and 10-2023-0072979, Jun. 7, 2023, the disclosure of which is incorporated herein by reference in its entirety.

BACKGROUND

1. Technical Field

The present disclosure relates to a system and method for classifying novel class objects.

2. Description of Related Art

An object classification model according to the prior art predefines a set of base classes to be classified and performs object classification assuming that an input image contains only objects from these predefined classes. Hence, in order to apply such an object classification model to real-world applications where novel class objects appear, it is necessary to acquire a large amount of training data for these novel classes and train the object classification model using the training dataset, which requires a lot of time and costs.

A method of classifying novel class objects according to the prior art requires more training time since it is trained with only a limited amount of training data from a randomly initialized state. In addition, it often leads to reduced object classification performance due to overfitting or unexpected random effects from its initial values.

SUMMARY

Various embodiments are directed to a system and method for classifying novel class objects, which are capable of setting up a novel classifier model by utilizing parameterization that leverages prior knowledge from a base classifier, thereby allowing the training process to be expedited and improving object classification performance compared to the prior art.

In accordance with an aspect of the present disclosure, there is provided a method of classifying novel class objects, which includes (a) constructing a novel classifier considering prior knowledge acquired from a base classifier, and (b) learning a parameterized weight coefficient of a novel classifier model during the training of the novel classifier.

In (a) above, a parameter of the base classifier previously learned for a set of base classes may be considered as the prior knowledge.

In (a) above, a preset number of Gaussian random vectors may be used as additional basis vectors to construct the novel classifier capable of expressing any novel class.

In (b) above, a parameter of the novel classifier model may be parameterized with the weight coefficient, and then the weight coefficient is updated to streamline the training of the novel classifier.

The method of classifying novel class objects may further include (c) performing object recognition for a novel class by applying it to an object recognition model. In (c) above, a feature map (hereinafter, referred to as "first feature map") may be obtained through a backbone network by processing an input image, a feature map in a feature pyramid network (hereinafter, referred to as "FPN feature map") may be obtained using the first feature map, and a result of object recognition in the input image may be output.

In (c) above, the FPN feature map may be obtained by attaching a convolutional layer to the first feature map or by merging a result of attaching the convolutional layer to the first feature map with an upsampled FPN feature map for calculation.

In (c) above, a classification head, a centerness head, a regression head, and a controller head associated with the FPN feature map may be used, where the controller head may be used to set a parameter of a mask head for object recognition, and the result of object recognition is output through an instance-wise mask head.

In (c) above, an objective function used for training may be constructed through a combination of an objective function to improve object classification performance, an objective function to find object centerness, an objective function for object bounding box regression, and an objective function for mask-based object recognition, and the object recognition model may be trained by fine-tuning the classification head, centerness head, regression head, and controller head of the object recognition model.

In accordance with another aspect of the present disclosure, there is provided a system for classifying novel class objects, which includes an input interface device configured to receive prior knowledge from a base classifier, a memory configured to store a program that constructs and trains a novel classifier by considering the prior knowledge of the base classifier, and a processor configured to execute the program. The program involves learning a parameterized weight coefficient of a novel classifier model during the training of the novel classifier.

The prior knowledge may be a parameter of the base classifier previously learned for a set of base classes.

The processor may use a preset number of Gaussian random vectors as additional basis vectors to construct the novel classifier.

The processor may involve the process of parameterizing a parameter of the novel classifier model with the weight coefficient.

The processor may apply a method for classifying novel class objects to an object recognition model, to obtain a first feature map through a backbone network by processing an input image, to obtain a feature pyramid network (FPN) feature map using the first feature map, and to output a result of object recognition in the input image.

The processor may attach a convolutional layer to the first feature map or merge a result of attaching the convolutional layer to the first feature map with an upsampled FPN feature map for calculation.

The processor may output the result of object recognition using a classification head, a centerness head, a regression head, and a controller head associated with the FPN feature map.

The processor may construct an objective function used for training through a combination of an objective function to improve object classification performance, an objective function to find object centerness, an objective function for object bounding box regression, and an objective function for mask-based object recognition, and perform object recognition model training by fine-tuning the classification head, centerness head, regression head, and controller head of the object recognition model.

BRIEF DESCRIPTION OF THE DRAWINGS

FIG. 6 illustrates a result of arbitrarily initializing and then training a novel classifier based on the prior art, a result of parameterizing and then training a novel classifier using only a base classifier according to the embodiment of the present disclosure, and a result of parameterizing and then training a novel classifier using the base classifier and Gaussian random vector according to the embodiment of the present disclosure.

DETAILED DESCRIPTION

Figure 1:
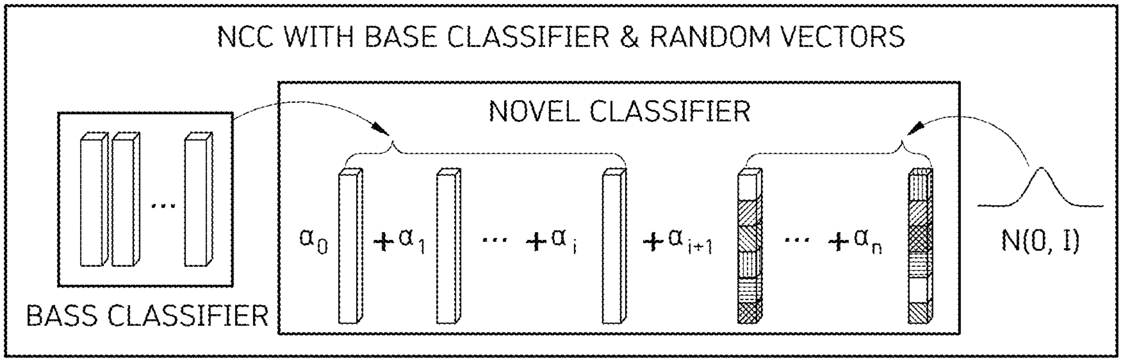
FIG. 1 illustrates novel class object classification according to an embodiment of the present disclosure.

The above and other objects, advantages, and features of the present disclosure and methods of achieving them will become apparent with reference to the embodiments described below in detail in conjunction with the accompanying drawings.

The present disclosure may, however, be embodied in different forms and should not be construed as limited to the embodiments set forth herein. The following embodiments are provided solely to facilitate the purpose, configuration and effect of the disclosure to those of ordinary skill in the art to which the present disclosure pertains, and the scope of the present disclosure is defined by the appended claims.

Meanwhile, the terms used herein are for the purpose of describing the embodiments and are not intended to limit the disclosure. As used herein, the singular forms "a", "an" and "the" are intended to include the plural forms as well, unless context clearly indicates otherwise. It will be understood that the terms "comprises"/"includes" and/or "comprising"/"including" when used in the specification, specify the presence of stated components, steps, motions, and/or elements, but do not preclude the presence or addition of one or more other components, steps, motions, and/or elements.

Object classification is one of the most fundamental task for understanding images in visual intelligence research. Object classification involves identifying the type of object contained an input image I and assigning a class ($c \in \mathcal{C}$) to that object. Object classification is not only important in itself for understanding images, but is also essential for addressing other detailed image understanding issues such as object detection or instance segmentation, and has a significant impact on individual performance.

The process of object classification according to the prior art is as follows. A sophisticated artificial intelligence model for object classification and a training dataset $\mathcal{D}$ consisting of a large amount of training to be used when training the artificial intelligence model are prepared. In this case, each element of the training dataset $\mathcal{D}$ is composed of a pair (I, $\mathcal{A}_I$) of an image I and a result of object classification $\mathcal{A}_I$ of I written by a person. For a predefined set of base classes $\mathcal{C}_B$ to be classified, $\mathcal{A}_I$ may be configured in different forms depending on visual intelligence applications including object classification.

For example, $\mathcal{A}_I$ may include class information ($c \in \mathcal{C}_B$) of the object appearing in the image I. In another example, $\mathcal{A}_I$ may be composed of a pair ($c_i$, $b_i$) ($1 \le i \le N_I$), each consisting of class information ($c_i \in \mathcal{C}_B$) of each of the $N_I$ objects appearing in the image I and bounding-box-level information ($b_i$) indicating the location of each object. In a further example, $\mathcal{A}_I$ may be composed of a pair ($c_i$, $m_i$) ($1 \le i \le N_I$), each consisting of class information ($c_i \in \mathcal{C}_B$) of each of the $N_I$ objects appearing in the image I and pixel-level information ($m_i$) indicating the location of each object.

In the training stage of an initial artificial intelligence model, the artificial intelligence model is updated repeatedly so that the result of object classification output by the model is close to the result of object classification $\mathcal{A}_I$ written by a person for each image I of the training dataset $\mathcal{D}$. Using the artificial intelligence model trained in this way, object classification is performed on any image in the actual testing stage.

An object classification model according to the prior art predefines a set of base classes ($\mathcal{C}_B$) to be classified, and then performs object classification assuming that an input image I contains only objects of the class belonging to $\mathcal{C}_B$.

However, a large number of novel class objects may appear in many real-world applications that require visual intelligence technology. In particular, these novel classes may vary depending on the specific application of the visual intelligence model.

Hence, in order to use a conventional object classification method, it is necessary to acquire a large amount of training data for these novel classes and train the object classification model for each specific application, which inevitably takes a lot of time and costs.

To solve the aforementioned problem, there is proposed a method of adding a novel classifier for classifying objects of the class belonging to a set of novel classes $\mathcal{C}_N$ to quickly train the novel classifier, in addition to a base classifier for classifying objects of the class belonging to a predefined set of base classes $\mathcal{C}_B$.

The representative method thereof is to utilize low-shot learning, which involves training with a very small number of examples. In the low-shot learning, the model is trained using 30 or fewer examples for each class in the set of novel classes $\mathcal{C}_N$.

The process of classifying novel class objects using low-shot learning as follows. First, a base classifier that classifies objects of the class belonging to a set of base classes $\mathcal{C}_B$ is trained in the same way as training the conventional object classification model. Next, in the trained object classification model, a randomly initialized novel classifier that classifies objects of the class belonging to a set of novel classes $\mathcal{C}_N$ is added and then trained using a training dataset for the novel classes. In this case, training only the novel classifier without updating the object classification model may exhibit better performance in most cases.

The method described above for classifying novel class objects requires more training time since it is trained with only a limited amount of training data from a randomly initialized state. In addition, it may lead to reduced object classification performance due to overfitting or unexpected random effects from its initial values.

In order to solve the aforementioned problem, the present disclosure proposes a method of constructing a novel classifier model by utilizing prior knowledge acquired from a base classifier that is trained with a large amount of training data.

FIG. 1 illustrates novel class object classification according to an embodiment of the present disclosure.

According to the embodiment of the present disclosure, a parameter $\theta_N$ of a novel classifier is modeled by incorporating a parameter $\theta_B$ of a base classifier, which has been previously learned for a set of base classes ($\mathcal{C}_B$) as prior knowledge.

The parameter $\theta_N$ of the novel classifier according to the embodiment of the present disclosure is defined as Equation 1 below.

$$\theta_N(\alpha) = [\theta_B; R]\alpha \quad \text{[Equation 1]}$$

$\theta_B \in \mathbb{R}^{d\times|\mathcal{C}_B|}$ refers to a collection of $|\mathcal{C}_B|$ d-dimensional base classifiers, $R \in \mathbb{R}^{d\times r}$ refers to a collection of r d-dimensional Gaussian random vectors, and $\alpha \in \mathbb{R}^{(|\mathcal{C}_B|+r)\times|\mathcal{C}_N|}$ refers to a weight coefficient.

According to the embodiment of the present disclosure, the novel classifier is trained by parameterizing the parameter $\theta_N$ of the novel classifier model with the weight coefficient $\alpha$ and updating the weight coefficient $\alpha$.

The novel classifier according to the embodiment of the present disclosure is modeled by a linear combination of the parameters of the base classifier, and the novel classifier is constructed by expressing the novel class through an appropriate combination of prior knowledge of the base classifier.

The dimension d of each classifier has a large value such as 256 or 512, while the number of base classifiers, namely, the number of base classes $|\mathcal{C}_B|$, has a relatively small value. For example, for an MS-COCO dataset, the number of base classes $|\mathcal{C}_B|$ used in typical low-shot learning is 60.

As such, if the number of base classifiers $|\mathcal{C}_B|$ is less than the dimension d of the classifier, the subspace that may be created by the base classifiers is inherently limited. This means that a large null space is created that may not be expressed with only the base classifier. The existence of such a null space implies that all novel classes may not be expressed exclusively with prior knowledge of the base classifier.

In order to overcome the above limitations, the present disclosure constructs a novel classifier that can express any novel class by utilizing r Gaussian random vectors R as additional basis vectors, which enhances high expressive power for novel classes, thereby leading to improved object classification performance compared to conventional object classification methods.

When training the novel classifier according to the embodiment of the present disclosure, the parameterized weight coefficient $\alpha$ is learned, rather than all of the parameters $\theta_N$ of the novel classifier model.

Compared to the prior art where the number of parameters to be learned for the novel classifier is $d|\mathcal{C}_N|$, the number of parameters to be learned for the novel classifier according to the embodiment of the present disclosure is $(|\mathcal{C}_B|+r)\times|\mathcal{C}_N|$.

Usually, the dimension d of the classifier has a large value, while $|\mathcal{C}_B|+r$ has a smaller value. Hence, the number of parameters to be learned according to the embodiment of the present disclosure is significantly reduced.

Therefore, according to the embodiment of the present disclosure, the training of the novel classifier can proceed more quickly, and efficient training is possible without overfitting in situations where the novel classifier is to be trained with a small number of training data, such as in low-shot learning settings.

Figure 2:
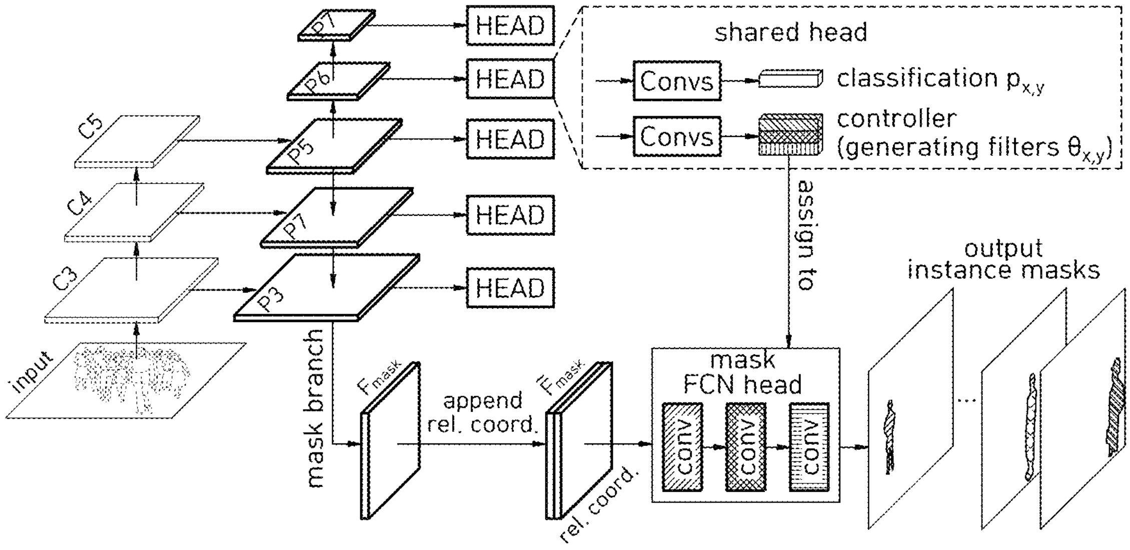
FIG. 2 illustrates an example of an object recognition model according to the embodiment of the present disclosure.

FIG. 2 illustrates an example of an object recognition model according to the embodiment of the present disclosure.

The method of classifying novel class objects according to the embodiment of the present disclosure may be applied to the object recognition model illustrated in FIG. 2 for use to improve object recognition performance for novel classes.

When an input image is entered, the object recognition model illustrated in FIG. 2 first passes through a backbone network. Here, the backbone network may use a well-known ResNet-50 or the like. C3, C4, and C5 refer to feature maps with different resolutions that may be extracted from the backbone network.

The feature maps P3, P4, P5, P6, and P7 in the feature pyramid network (FPN) may be obtained using C3, C4, and C5.

In this case, P5 is calculated by attaching a 1×1 convolutional layer to C5, P3 and P4 are calculated by attaching 1×1 convolutional layers to C3 and C4 and then merging them with results of upsampling P4 and P5, respectively, and P6 and P7 are calculated by attaching 1×1 convolutional layers to P5 and P6, respectively.

For the feature maps P3, P4, P5, P6, and P7, there are a classification head for separate object classification, a centerness head for finding object centerness, a regression head for bounding box regression, and a controller head for object recognition.

The controller head may be used to set a mask head parameter for object recognition.

The result of upsampling the feature maps P4 and P5 and adding them to P3 passes through several convolutional layers and an instance-wise mask head to output the result of recognizing each object appearing in a corresponding image.

The training process of the object recognition model illustrated in FIG. 2 will be described as follows. The entire object recognition model is trained using the training dataset consisting of the set of base classes $\mathcal{C}_B$. In this case, the objective function used for training is constructed through a combination of an objective function $L_{cls.}$ to improve object classification performance, an objective function $L_{cen.}$ to find object centerness, an objective function $L_{reg.}$ for object bounding box regression, and an objective function $L_{mask}$ for mask-based object recognition.

After the object recognition model is trained for the base class, the classification head, centerness head, regression head, and controller head of the object recognition model are fine-tuned using the training dataset consisting of the set of novel classes $\mathcal{C}_N$ to recognize novel class objects.

The training method of the object recognition model according to the embodiment of the present disclosure may be changed in detail depending on the training dataset, the training scope (training the entire model or only the head part, etc.), and the training method (supervised/unsupervised/weakly supervised training, etc.).

Referring to FIG. 2, unlike the prior art which performs fine-tuning after arbitrarily initializing the classification head part, the present disclosure utilizes prior knowledge of the base classifier to parameterize it with the weight coefficient $\alpha$, and then performs fine-tuning.

Figure 3:
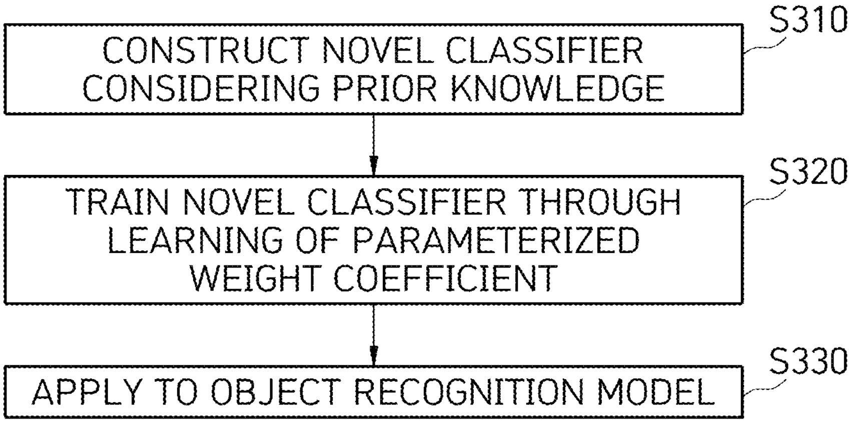
FIG. 3 is a flowchart illustrating a method of classifying novel class objects according to the embodiment of the present disclosure.

FIG. 3 is a flowchart illustrating a method of classifying novel class objects according to the embodiment of the present disclosure.

The method of classifying novel class objects according to the embodiment of the present disclosure includes the steps of: constructing a novel classifier model considering prior knowledge acquired from a base classifier (S310) and learning a parameterized weight coefficient of a novel classifier model during the training of the novel classifier (S320).

In step S310, a parameter of the base classifier previously learned for a set of base classes is considered as the prior knowledge.

In step S310, a preset number of Gaussian random vectors is used as additional basis vectors to construct the novel classifier capable of expressing any novel class.

In step S320, a parameter of the novel classifier model is parameterized with the weight coefficient and the weight coefficient is updated to streamline the training of the novel classifier.

The method of classifying novel class objects according to the embodiment of the present disclosure further includes the step of performing object recognition for a novel class by applying it to an object recognition model (S330). In step S330, a feature map (hereinafter, referred to as "first feature map") is obtained through a backbone network by processing an input image, a feature map in a feature pyramid network (hereinafter, referred to as "FPN feature map") is obtained using the first feature map, and a result of object recognition in the input image is output.

In step S330, the FPN feature map is obtained by attaching a convolutional layer to the first feature map or by merging a result of attaching the convolutional layer to the first feature map with an upsampled FPN feature map for calculation.

In step S330, a classification head, a centerness head, a regression head, and a controller head associated with the FPN feature map are used, where the controller head is used to set a parameter of a mask head for object recognition, and the result of object recognition is output through an instance-wise mask head.

In step S330, an objective function used for training is constructed through a combination of an objective function to improve object classification performance, an objective function to find object centerness, an objective function for object bounding box regression, and an objective function for mask-based object recognition, and the object recognition model is trained by fine-tuning the classification head, centerness head, regression head, and controller head of the object recognition model.

Figure 4:
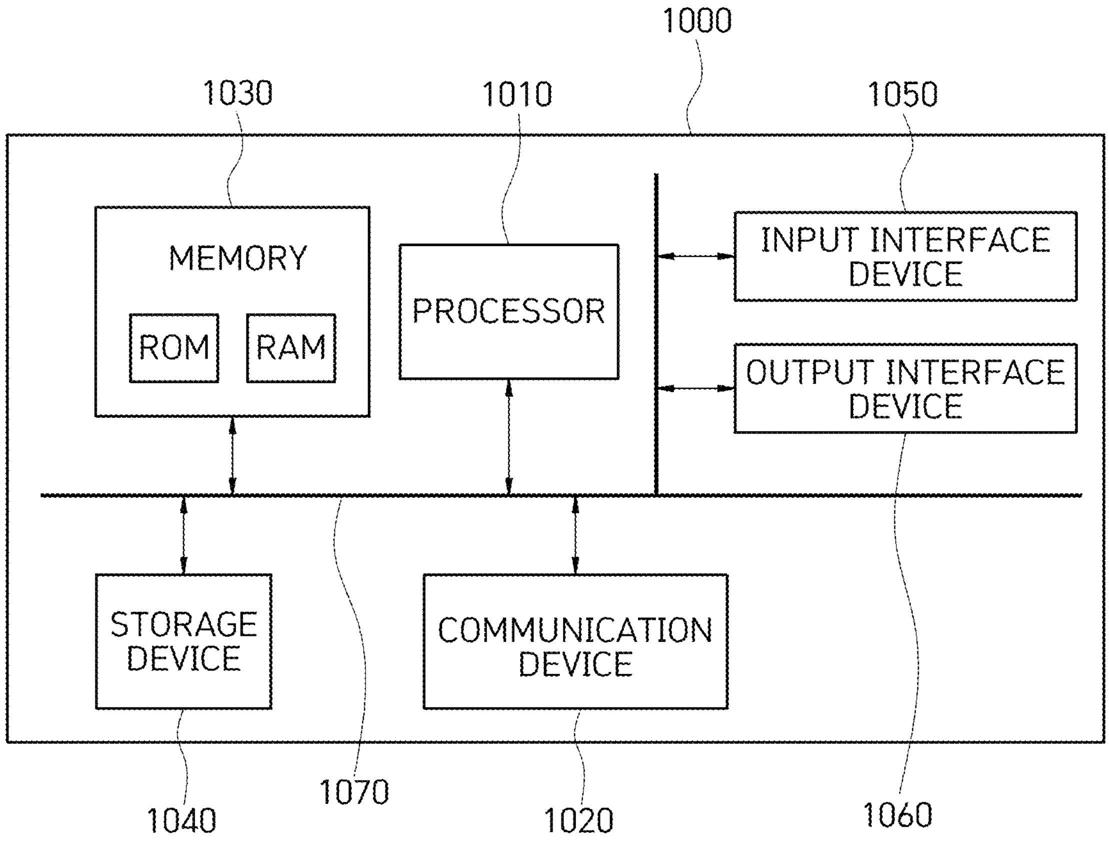
FIG. 4 is a block diagram illustrating a computer system for implementing the method according to the embodiment of the present disclosure.

FIG. 4 is a block diagram illustrating a computer system for implementing the method according to the embodiment of the present disclosure.

A system for classifying novel class objects according to an embodiment of the present disclosure includes an input interface device that receives prior knowledge from a base classifier, a memory storing a program that constructs and trains a novel classifier by considering the prior knowledge of the base classifier, and a processor that executes the program, which involves learning a parameterized weight coefficient of a novel classifier model during the training of the novel classifier.

The prior knowledge is a parameter of the base classifier previously learned for a set of base classes.

The processor uses a preset number of Gaussian random vectors as additional basis vectors to construct the novel classifier.

The processor involves the process of parameterizing a parameter of the novel classifier model with the weight coefficient.

The processor applies a method for classifying novel class objects to an object recognition model, to obtain a first feature map through a backbone network by processing an input image, to obtain a feature pyramid network (FPN) feature map using the first feature map, and to output a result of object recognition in the input image.

The processor attaches a convolutional layer to the first feature map or merges a result of attaching the convolutional layer to the first feature map with an upsampled FPN feature map for calculation.

The processor outputs the result of object recognition using a classification head, a centerness head, a regression head, and a controller head associated with the FPN feature map.

The processor constructs an objective function used for training through a combination of an objective function to improve object classification performance, an objective function to find object centerness, an objective function for object bounding box regression, and an objective function for mask-based object recognition, and performs object recognition model training by fine-tuning the classification head, centerness head, regression head, and controller head of the object recognition model.

Referring to FIG. 4, the computer system, which is designated by reference numeral 1000, may include at least one of a processor 1010, a memory 1030, an input interface device 1050, an output interface device 1060, and a storage device 1040 that communicate with each other through a bus 1070. The computer system 1000 may also include a communication device 1020 coupled to a network. The processor 1010 may be a central processing unit (CPU) or a semiconductor device that executes instructions stored in the memory 1030 or the storage device 1040. The memory 1030 and the storage device 1040 may include various types of volatile or non-volatile storage media. For example, the memory may include a read only memory (ROM) and a random access memory (RAM). In the embodiment of the present disclosure, the memory may be located inside or outside the processor, and the memory may be connected to the processor through various known means. The memory may include various types of volatile or non-volatile storage media. For example, the memory may be a read only memory (ROM) or a random access memory (RAM).

Accordingly, the embodiment of the present disclosure may be embodied by a computer-implemented method or by a non-transitory computer-readable medium storing computer-executable instructions. In an embodiment, computer readable instructions may perform, when executed by a processor, a method according to at least one aspect of the present disclosure.

The communication device 1020 may transmit or receive a wired signal or a wireless signal.

In addition, the method according to the embodiment of the present disclosure may be implemented in the form of program instructions that can be executed through various computer means and recorded on a computer-readable medium.

The computer-readable medium may include program instructions, data files, data structures, etc., alone or in combination. The program instructions recorded on the computer-readable medium may be specially designed and configured for embodiments of the present disclosure, or may be known and usable by those skilled in the art of computer software. The computer-readable recording medium may include a hardware device configured to store and perform program instructions. For example, The computer-readable recording media may be a magnetic medium such as hard disk, floppy disk, or magnetic tape, an optical medium such as CD-ROM or DVD, a magneto-optical medium such as floptical disk, ROM, RAM, flash memory, etc. The program instruction may include not only machine language code such as that created by a compiler, but also high-level language code that can be executed by a computer through an interpreter or the like.

Figure 5:
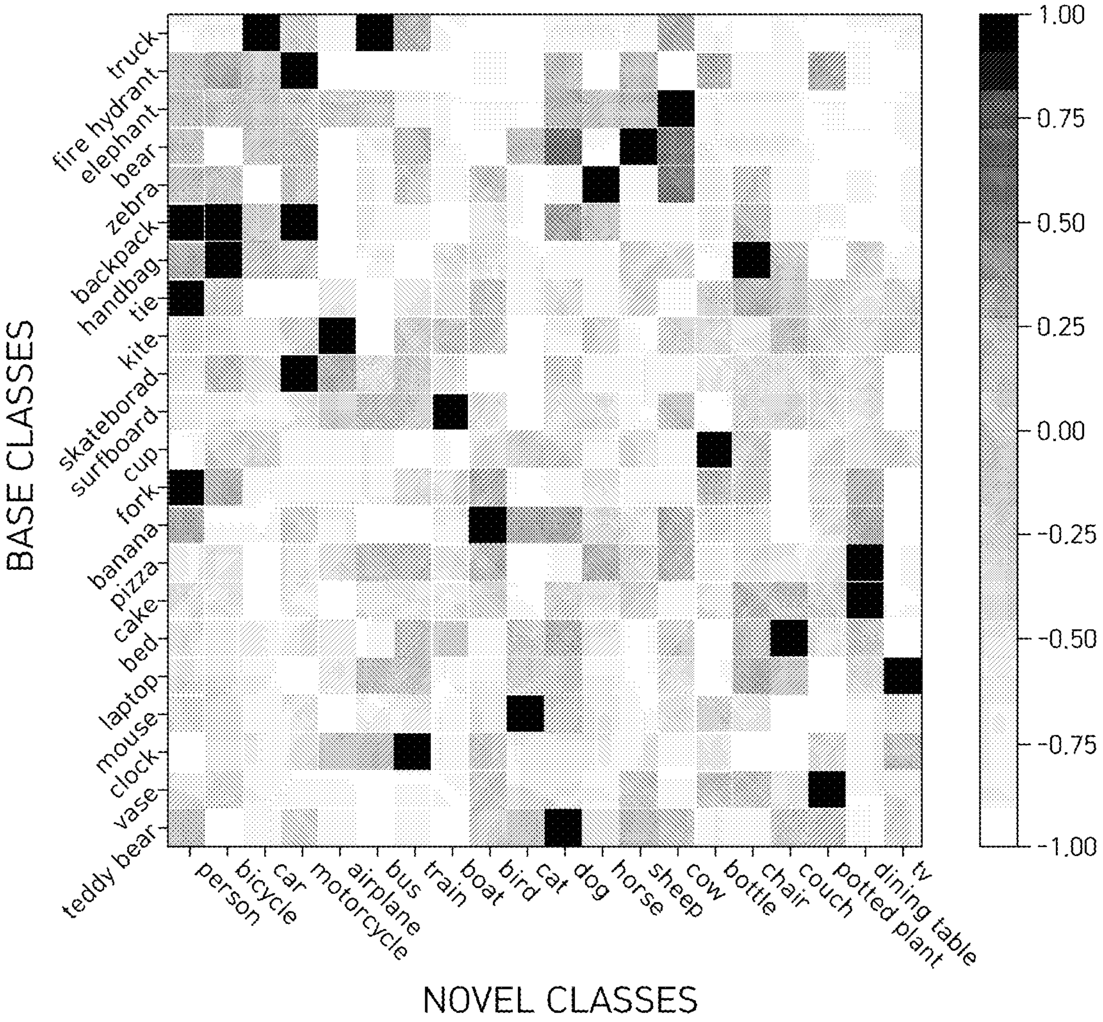
FIG. 5 illustrates a result of weight coefficient visualization in the method of classifying novel class objects according to the embodiment of the present disclosure.

FIG. 5 illustrates a visualization of weight coefficient results from the method of classifying novel class objects according to the embodiment of the present disclosure.

FIG. 5 is a diagram visualizing $\alpha' \in \mathbb{R}^{20\times|\mathcal{C}^{N}|}$, which is a subset of the weight coefficients of the novel classifier learned using the MS-COCO dataset. For analytical convenience, only the top 20 classes determined by the maximum weight among the 60 base classes are visualized.

Each row in the visualization represents a base class and each column represents a novel class. Each element means a normalized value of the weight coefficient of the base class corresponding to each row in the novel classifier corresponding to each column.

In other words, each element indicates how much of the classifier of each base class is used when the novel classifier is constructed. It appears closer to 1.00 as the value of the corresponding element increases, and it appears closer to −1.00 as the value of the corresponding element decreases.

Referring to FIG. 5, it can be seen that prior information from semantically or visually similar base classes is more often used to express novel classes. For example, the first row in the figure, representing the base class “truck”, shows that the “truck” classifier significantly affects the classifiers for novel classes such as “car”, “motorcycle”, “bus”, and “train”. In other words, the stronger the correlation between a base class and a new class, the more it appears closer to 1.00, and the weaker it appears closer to −1.00.

FIG. 6 illustrates a result of arbitrarily initializing and then training a novel classifier based on the prior art (A), a result of parameterizing and then training a novel classifier using only a base classifier according to the embodiment of the present disclosure (B), and a result of parameterizing and then training a novel classifier using the base classifier and Gaussian random vector (Noise part in FIG. 5) according to the embodiment of the present disclosure (C).

FIG. 6 illustrates a quantitative result of a novel class object recognition model according to the embodiment of the present disclosure for the low-shot learning-based object recognition model based on the object recognition model of FIG. 2 described above.

Referring to FIG. 6, it can be seen that the prior knowledge of the base classifier has a positive influence on novel classifiers, resulting in an improved result in both object detection and instance segmentation.

Referring to FIG. 6, it can be seen that the Gaussian random vectors help express novel classes, resulting in an improved result in both object detection and instance segmentation.

Figure 7:
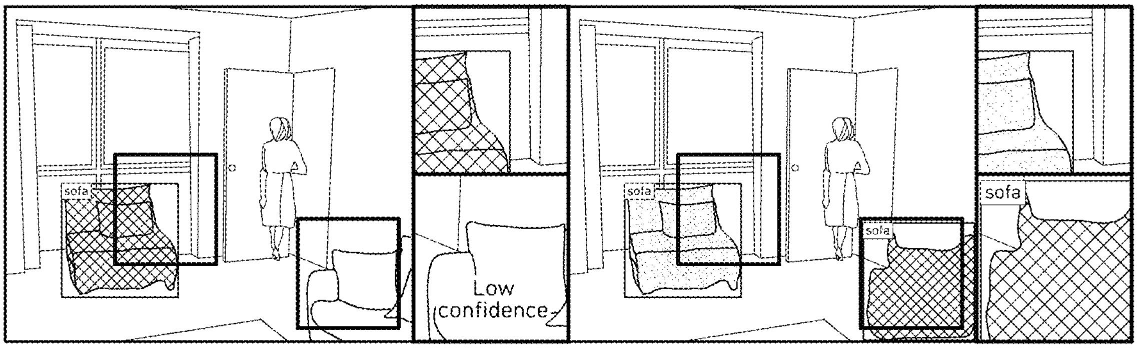
FIG. 7 illustrates a result of object recognition based on low-shot learning and a result of improved object recognition according to the embodiment of the present disclosure.

FIG. 7 illustrates a result of novel class object recognition according to the embodiment of the present disclosure for the low-shot learning-based object recognition model based on the object recognition model of FIG. 2 described above.

Since the low-shot learning-based object recognition model is trained with only a limited amount of training data, the novel class object classification result may be inevitably degraded in overall classification performance.

The left in FIG. 7 illustrates a result of object recognition based on low-shot learning according to the prior art.

As can be seen in the box area at the bottom right, according to the prior art, even though an object clearly exists in the input image, the object is not classified for the corresponding novel class, which may not be output as an object recognition result.

The right in FIG. 7 illustrates a result of improved object recognition according to the embodiment of the present disclosure. According to the embodiment of the present disclosure, object classification for novel classes enables the accurate recognition of previously unrecognized objects. According to the embodiment of the present disclosure, it is possible to achieve a high-level object classification result even for novel classes.

As apparent from the above description, according to the present disclosure, it is possible to speed up training and improve object classification performance even with a limited amount of training data, by parameterizing the novel classifier using the prior knowledge of the pre-trained base classifier for classifying base class objects when attempting to perform the task of novel class object classification using the artificial intelligence model such as a deep artificial neural network.

The present disclosure is not limited to the above effect, and other effects of the present disclosure will be clearly understood by those skilled in the art from the above description.

Although the specific embodiments have been described with reference to the drawings, the present disclosure is not limited thereto. It will be apparent to those skilled in the art that various changes and modifications may be made without departing from the spirit and scope of the disclosure as defined in the following claims.

What is claimed is:

1. A method of classifying novel class objects, comprising:

(a) constructing a novel classifier considering prior knowledge acquired from base classifiers previously trained for a set of base classes; and (b) learning parameterized weight coefficients of a novel classifier model during a training of the novel classifier, wherein parameters of the novel classifier model are generated as a linear combination of parameters of the base classifiers and a preset number of Gaussian random vectors used as additional basis vectors, the method further comprising: receiving an input image; processing the input image through a backbone network to obtain a first feature map; and performing object recognition for the novel class using the trained novel classifier based on the first feature map.

2. The method according to claim 1, wherein (a) further comprises considering parameters of the base classifiers previously learned for a set of base classes as the prior knowledge.

3. The method according to claim 1, wherein (a) further comprises using a preset number of Gaussian random vectors as additional basis vectors together with parameters of the base classifiers to construct the novel classifier capable of expressing any novel class.

4. The method according to claim 1, wherein (b) further comprises parameterizing parameters of the novel classifier model with the weight coefficients, and then updating the weight coefficients to streamline the training of the novel classifier while parameters of the base classifiers are maintained fixed.

5. The method according to claim 1, further comprising (c) performing object recognition for a novel class object by applying a novel class to an object recognition model, wherein (c) further comprises obtaining a first feature map through a backbone network by processing an input image, obtaining a feature map in a feature pyramid network (FPN) using the first feature map, and outputting a result of object recognition in the input image.

6. The method according to claim 5, wherein (c) further comprises obtaining the FPN feature map by attaching a convolutional layer to the first feature map or merging a result of attaching the convolutional layer to the first feature map with an upsampled FPN feature map for calculation by a processor of a computing system.

7. The method according to claim 5, wherein (c) further comprises using a classification head, a centerness head, a regression head, and a controller head associated with the FPN feature map, where the controller head is used to set a parameter of a mask head for object recognition, and the result of object recognition is output through an instance-wise mask head.

8. The method according to claim 7, wherein (c) further comprises constructing an objective function used for training through a combination of an objective function to improve object classification performance, an objective function to find object centerness, an objective function for object bounding box regression, and an objective function for mask-based object recognition, and training the object recognition model by fine-tuning the classification head, centerness head, regression head, and controller head of the object recognition model.

9. A system for classifying novel class objects, comprising:

a processor configured to receive prior knowledge from base classifiers; and a memory configured to store a program that constructs and trains a novel classifier, by considering the prior knowledge of the base classifiers, wherein the processor is further configured to execute the program, wherein the program involves learning parameterized weight coefficients of a novel classifier model during the training of the novel classifier and generating parameters of the novel classifier model as a linear combination of parameters of the base classifiers and a preset number of Gaussian random vectors.

10. The system according to claim 9, wherein the prior knowledge is parameters of the base classifiers previously learned for a set of base classes.

11. The system according to claim 9, wherein the processor uses a preset number of Gaussian random vectors as additional basis vectors together with parameters of the base classifiers to construct the novel classifier.

12. The system according to claim 9, wherein the processor may involve the process of parameterizing parameters of the novel classifier model with the weight coefficient.

13. The system according to claim 9, wherein the processor applies a method for classifying novel class objects to an object recognition model, to obtain a first feature map through a backbone network by processing an input image, to obtain a feature pyramid network (FPN) feature map using the first feature map, and to output a result of object recognition in the input image.

14. The system according to claim 13, wherein the processor attaches a convolutional layer to the first feature map merging a result of attaching the convolutional layer to the first feature map with an upsampled FPN feature map for calculation.

15. The system according to claim 13, wherein the processor outputs the result of object recognition using a classification head, a centerness head, a regression head, and a controller head associated with the FPN feature map.

16. The system according to claim 15, wherein the processor constructs an objective function used for training through a combination of an objective function to improve object classification performance, an objective function to find object centerness, an objective function for object bounding box regression, and an objective function for mask-based object recognition, and performs object recognition model training by fine-tuning the classification head, centerness head, regression head, and controller head of the object recognition model.

* * * * *